United States Patent [19]

Kageyama et al.

[11] Patent Number: 4,808,216

[45] Date of Patent: Feb. 28, 1989

[54] PROCESS FOR PRODUCING ULTRAFINE METAL POWDER

[75] Inventors: Yoshiteru Kageyama; Yoshiaki Sawada, both of Yokkaichi, Japan

[73] Assignee: Mitsubishi Petrochemical Company Limited, Tokyo, Japan

[21] Appl. No.: 184,280

[22] Filed: Apr. 21, 1988

[30] Foreign Application Priority Data

Apr. 25, 1987 [JP] Japan .............................. 62-102567
Apr. 25, 1987 [JP] Japan .............................. 62-102568
Sep. 28, 1987 [JP] Japan .............................. 62-243386

[51] Int. Cl.$^4$ .............................................. B22F 9/30
[52] U.S. Cl. .............................. 75/0.5 A; 75/0.5 AA; 75/0.5 AB; 75/251
[58] Field of Search .......... 75/0.5 A, 0.5 AA, 0.5 AB

[56] References Cited

U.S. PATENT DOCUMENTS

| | | | |
|---|---|---|---|
| 2,884,319 | 4/1959 | Fabian et al. ............................ | 75/251 |
| 2,983,997 | 5/1961 | Schmeckenbecher ............... | 428/566 |
| 3,172,776 | 3/1965 | Manly, Jr. ............................ | 252/62.54 |
| 3,200,007 | 8/1965 | Flowers ............................ | 252/62.54 |
| 3,228,882 | 1/1966 | Harle et al. ............................ | 428/900 |

Primary Examiner—Wayland Stallard
Attorney, Agent, or Firm—Koda and Androlia

[57] ABSTRACT

In a process for producing an ultrafine powder of a metal by subjecting a transition metal carbonyl compound to gas phase pyrolysis reaction, the improvement which comprises diluting said carbonyl compound with an inert gas or hydrogen to a concentration of 3 vol. % or less with optional addition of an oxygen-containing organic compound and/or a sulfur-containing organic compound in an amount of 0.0001 to 0.1 mol per mol of said carbonyl compound to prepare a gas mixture, and then carrying out gas phase pyrolysis reaction at 300° C. or higher by allowing said gas mixture to reside for 5 seconds or less in a reaction system to which a magnetic field of 100 gauss or higher is being applied, thereby obtaining the ultrafine powder of said metal having a length of 1 micron or less, a coercive force of 800 oersted or higher and a saturation magnetization of 120 emu/g or higher.

15 Claims, 1 Drawing Sheet

PROCESS FOR PRODUCING ULTRAFINE METAL POWDER

BACKGROUND OF THE INVENTION

This invention relates to a process for producing an ultrafine metal powder. More particularly, this invention relates to a process for producing an ultrafine magnetic metal powder having excellent magnetic characteristics suitable for a high density magnetic recording medium, etc., namely high coercive force and high saturation magnetization, by carrying out gas phase pyrolysis of a transition metal carbonyl compound under specific conditions.

In these days, fine particles of a γ-iron oxide are usually used as a magnetic recording medium. However, these particles have coercive forces of 400 to 900 oersted and saturation magnetizations of 90 emu/g or less, and are not suitable for a high density magnetic recording medium.

A recording medium used for an 8-mm video tape recorder (8-mm VTR), a digital audio tape (DTA) or the like is required to have such magnetic characteristics as coercive force of 1300 oersted or higher and saturation magnetization of 120 emu/g or higher. If the coercive force is smaller, anti-noise characteristic will be unsatisfactory, while if the saturated magnetization is smaller, sensitivity will be undesirably inferior.

As a high density magnetic recording medium suitable for an 8-mm VTR or DTA, an ultrafine metal powder which is produced by hydrogen reduction of an iron oxide carried out in a liquid phase has been employed. However, this powder has a tendency to generate internal voids, and magnetization occurs in the voids to give a multi-pole structure, which makes a poor dispersion of the magnetic material in a magnetic paint, leading to lowering of orientation and coercive force of a magnetic tape, and the liquid phase process has such drawbacks that the apparent density of the ultrafine powder obtained is extremely low, and therefore the separation process of the ultrafine powder from the solvent used becomes difficult, that the output per solvent is suppressed low, leading to high production cost, and that since heating at a low temperature for a long time is required because the material is liable to sinter during reduction, a large scale of equipment and enormous amount of hydrogen consumption are required and besides the preparation steps are complicated. Production of ultrafine powder by means of a gas phase method, which is free from such drawbacks, is thus desired.

Methods for obtaining an ultrafine metal powder by gas phase pyrolysis of a carbonyl compound of a transition metal such as Fe, Ni, etc. have been known, as disclosed in Japanese Patent Publication Nos. 24316/1968, 11529/1969 and 31809/1977, U.S. Pat. Nos. 2,983,997 and 2,884,319.

According to the methods disclosed in these specifications, however, the particle size of the powder obtained is as large as about several microns, and no method has been successful in obtaining an ultrafine metal powder having a length of 1 micron or less and an average particle size of 0.5 micron or less as intended by the present invention. Moreover, an ultrafine metal powder having excellent magnetic characteristics of high coercive force and high saturation magnetization suitable for a high density magnetic recording medium to be used for 8-mm VTR, DAT, etc. has not been obtained.

Japanese Patent Publication Nos. 1004/1964, 16868/1970, Japanese Laid-Open Patent Publication No. 137202/1983, and U.S. Pat. Nos. 3,172,776, 3,200,007 and 3,228,882, have proposed a process for obtaining an ultrafine metal powder by carrying out pyrolytic reaction of a transition metal carbonyl compound that is dissolved in a specific solvent. However, this process is a liquid phase process having the drawbacks as mentioned above, and thus involves various problems for mass production and in economy as compared with a gas phase process.

SUMMARY OF THE INVENTION

In view of the state of the art as described above, the present inventors have made an intensive research on an improved gas phase process for producing an ultrafine powder of a metal and eventually accomplished the present invention.

Thus, according to the present invention, there is provided in a process for producing an ultrafine powder of a metal by subjecting a transition metal carbonyl compound to gas phase pyrolysis reaction, the improvement which comprises diluting the carbonyl compound with an inert gas or hydrogen to a concentration of 3 vol. % or less with optional addition of an oxygen-containing organic compound and/or a sulfur-containing organic compound in an amount of 0.0001 to 0.1 mol per mol of the carbonyl compound to prepare a gas mixture, and then carrying out gas phase pyrolysis reaction at 300° C. or higher by allowing the gas mixture to reside for 5 seconds or less in a reaction system to which a magnetic field of 100 gauss or higher is being applied, thereby obtaining the ultrafine powder of the metal having a length of 1 micron or less, a coercive force of 800 oersted or higher and a saturation magnetization of 120 emu/g or higher.

According to the process of the present invention, a transition metal powder which is extremely fine such as of a length of 1 micron or less, preferably 0.5 micron or less, particularly preferably 0.3 micron or less and a width of 0.1 micron or less, can be obtained. The transition metal powder is also excellent in magnetic characteristics.

According to the process of the present invention, the above mentioned drawbacks involved in the known methods are satisfactorily overcome.

It is considered quite unexpected that such an ultrafine powder, which is excellent in magnetic characteristics, can be obtained by carrying out gas phase pyrolysis of a transition metal carbonyl compound under its specifically diluted state with application of a specific intensity of magnetic field.

DETAILED DESCRIPTION OF THE INVENTION

Transition metal carbonyl compound

Figure 1:
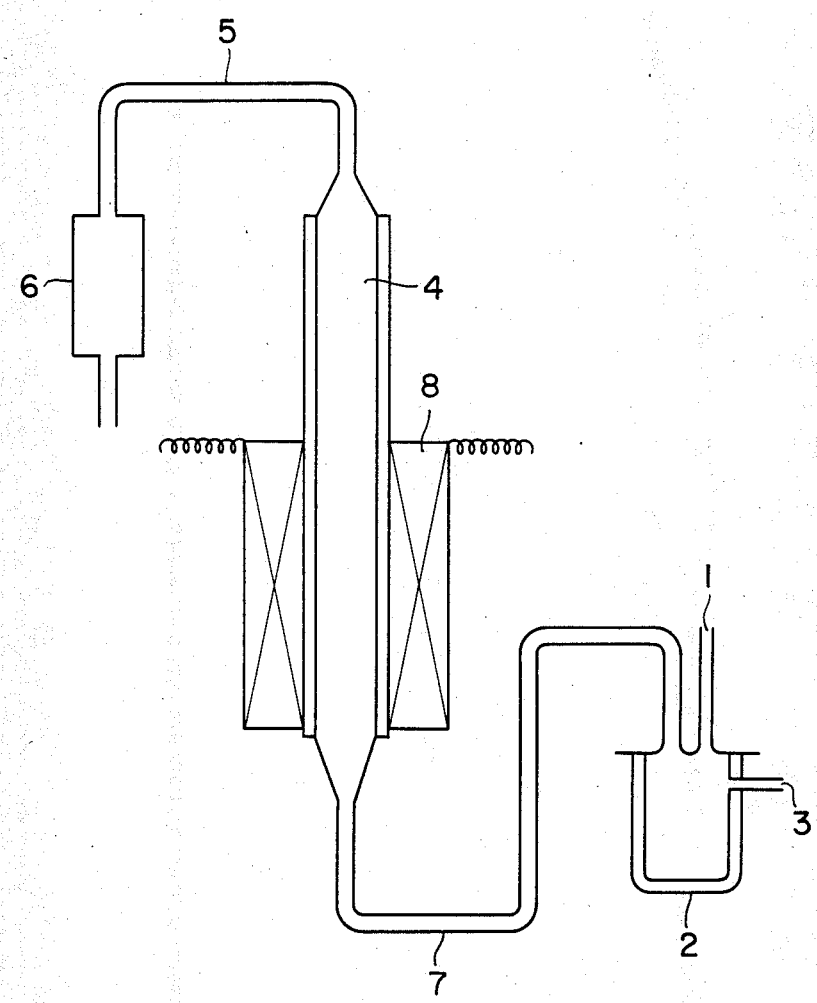

The transition metal carbonyl compound to be used in the present invention is a carbonyl compound of Fe, Ni, Co, W, Mo, etc. or a mixture thereof, preferably $Fe(CO)_5$ or $Ni(CO)_4$ having a low boiling point.

Carbonyl compounds of Co, W, etc. having a high boiling point, in addition to pyrolysis of itself to obtain its single metal powder, may be dissolved in a small amount of $Fe(CO)_5$ or $Ni(CO)_4$ which is fed into the reaction system, whereby powder of the alloy with the solvent metal can be also obtained.

Oxygen-containing organic compound

The oxygen-containing organic compound which may be used optionally in the present invention includes an alcohol, ester, ketone and ether. This compound should have a relatively small molecular weight or number of carbons so that they can form gas phase under the conditions of the pyrolytic reaction.

As the alcohol (including silanol), any of an aliphatic saturated alcohol, alicyclic alcohol and aromatic alcohol is usable. Specifically, there may be included methyl alcohol, ethyl alcohol, propyl alcohol, butyl alcchol, octyl alcohol, trimethyl silanol, ethylene glycol.

Specific examples of an ester may include ethyl benzoate, ethyl acetate, butyl butyrate.

Specific examples of a ketone may include acetone, diethyl ketone, methyl ethyl ketone, methyl propyl ketone.

Specific examples of ethers may include diethyl ether, tetrahydrofuran, dibutyl ether.

Among these oxygen-containing organic compounds, preferable compound for obtaining an ultrafine metal powder having excellent magnetic characteristics intended by the present invention is an alcohol. Specifically, a monovalent alcohol having about 1 to 8 carbon atoms is preferred.

Sulfur-containing organic compound

The sulfur-containing organic compound to be used optionally in the present invention includes a mercaptan and thioether. This compound should have a relatively small molecular weight or number of carbons so that it can form gas phase under the conditions of the pyrolytic reaction.

Examples of the mercaptan may include methanethiol, ethanethiol, n-propanethiol, n-butanethiol, n-pentanethiol, n-hexanethiol.

Examples of the thioether may include methylthiomethane, ethylthiomethane, butylthiomethane, propylthiomethane, ethylthioethane, propylthioethane, butylthioethane.

The amount of the oxygen-containing organic compound and/or sulfur containing organic compound used may be 0.1 to 0.0001, preferably 0.05 to 0.001 in terms of molar ratio relative to the transition metal carbonyl compound. If the molar ratio exceeds 0.1, oxides will be formed in the reaction product to lower its magnetic characteristics, while with the molar ratio less than 0.0001, no effect will appear.

Pyrolysis

The pyrolysis according to the present invention is not essentially different from that of the prior art in operation, except for applying a specific magnetic field on the pyrolysis zone.

FIG. 1 illustrates the gist of such pyrolysis according to the present invention.

In FIG. 1, a metal carbonyl compound is charged through the introducing pipe 1 into the mixing chamber 2. A diluting gas is introduced through the introducing pipe 3 into the mixing chamber 2 to obtain a gas mixture of the metal carbonyl compound having a predetermined concentration. On the other hand, through the introducing pipe 1 or 3 or through another introducing pipe 3' (not shown in the drawing), an oxygen-containing organic compound and/or a sulfur-containing organic compound is introduced into the chamber 2.

The use of the organic compound is preferred because the resulting metal powder can be made finer and the coercive force thereof can be higher.

As the diluting gas, an inert gas such as nitrogen, argon, etc. or hydrogen or the mixtures thereof may be used. The concentration of the transition metal carbonyl compound in the diluting gas may be in the range of 3 vol. % or less, preferably from 0.01 to 1.5 vol. %. If the dilution concentration exceeds 3 vol. %, the metal particle will grow to a great size, whereby a magnetic ultrafine metal powder having high coercive force as intended by the present invention cannot be obtained.

The gas mixture is delivered via the conduit 7 to the reaction tube 4. The residence time in the reaction tube may be appropriately 5 seconds or less, preferably 2 seconds or less. If the residence time exceeds 5 seconds, the particl size becomes greater, whereby the magnetic ultrafine metal powder intended by the present invention can be obtianed with difficulty. Since the term "residence" as herein used means such a short time one, it may be said that the pyrolysis according to the present invention is carried out while continuously passing the gas mixture through the reaction zone.

As the devices for application of a magnetic field on the reaction system, any device 8 may be used including those of permanent magnet, electromagnet, solenoid coil, etc. The magnetic field to be applied may be 100 gauss or higher, preferably 300 to 1500 gauss. By application of a magnetic field, the coercive force of the resulting ultrafine metal powder can be increased and further sufficient control of the particle size thereof becomes possible.

The decomposition temperature may be 300° C. or higher, preferably 400° C. to 700° C. Although an ultrafine metal powder may be obtained at a temperature of less than 300° C., the intended magnetic ultrafine metal powder having high coercive force cannot be obtained.

The metal powder formed by pyrolysis is recovered by delivering via the conduit 5 to the collecting chamber 6.

Needless to say, various modifications of the device shown in the figure are possible. Accordingly, for example, delivery of the gas mixture into the reaction chamber can also be done in the downward direction.

By carrying out the reaction under the above mentioned conditions, an ultrafine metal powder having a length of 1 micron or less and magnetic characteristics of a coercive force of 800 to 2500 oersted, preferably 1300 to 2500 oersted and a saturation magnetization of 120 to 200 emu/g can be obtained.

The ultrafine metal powder of the present invention may be preferably used for a high density magnetic recording medium. The high density magnetic recording medium can be prepared by mixing the above powder with a binder, optionally with addition of other additives, and applying the mixture onto a substrate such as polyester film, etc., followed by drying or surface treatment, and used as various magnetic recording media. The binder to be used may be a known thermoplastic resin or thermosetting resin or mixtures thereof. As the additive may be used a dispersing agent, lubricant, abrasive, antistatic agent, etc.

Although the ultrafine metal powder obtained according to the present invention is preferably used as a high density recording medium, there may be various fields requiring the same powder and thus the use of the ultrafine powder of the present invention is not limited to the recording medium.

EXPERIMENTAL EXAMPLES

Example 1

In a reaction device as shown in FIG. 1, into a reaction tube of an inner diameter of 27 mm and a length of 1 m, to which a magnetic field of 450 gauss was being applied, a gas mixture of 1.5 vol. % of $Fe(CO)_5$ and nitrogen as a diluent was fed under the conditions of reaction temperature 600° C./residence time 0.8 sec to carry out gas phase pyrolysis reaction.

Conversion to the product was 35% based on the $Fe(CO)_5$ fed.

The product was found by observation with a transmission electron microscope to be an ultrafine metal powder of the shape of straight chain (length: about 0.5 micron, width: about 0.04 micron). The specific surface area was 19 m$^2$/g. The magnetic coercive force and saturation magnetization were measured using a vibration type magnetometer, and were 850 oersted and 160 emu/g, respectively.

Example 2

Pyrolysis reaction was carried out in the same manner as in Example 1 except that hydrogen was used in place of nitrogen, and a mixture of $Co_2(CO)_8/Fe(CO)_5 = 1/20$ (molar ratio) was used in place of $Fe(CO)_5$.

Conversion to Fe-Co ultrafine powder formed was 38%. The specific surface area was 18 m$^2$/g, the coercive force 1080 oersted and the saturation magnetization 155 emu/g.

Example 3

Pyrolysis reaction was carried out in the same manner as in Example 1 except for changing the reaction temperature to 290° C.

Conversion to the product was 15%. The specific surface area was 12 m$^2$/g, the coercive force 530 oersted and the saturation magnetization 150 emu/g.

Comparative Example 1

Pyrolysis reaction was carried out in the same manner as in Example 1 except for changing the residence time to 8 seconds.

The specific surface area of the product was 6 m$^2$/g, the coercive force 350 oersted and the saturated magnetization 153 emu/g.

Comparative Example 2

Pyrolysis reaction was carried out in the same manner as in Example 1 except for changing the concentration of $Fe(CO)_5$ fed into the reaction system to 5 vol. %.

The specific surface area of the product was 3.2 m$^2$/g, the coercive force 250 oersted and the saturation magnetization 170 emu/g.

Comparative Example 3

Pyrolysis reaction was carried out in the same manner as in Example 1 except for changing the intensity of the magnetic field to 50 gauss.

The specific surface area of the product was 8.5 m$^2$/g, the coercive force 470 oersted and the saturation magnetization 148 emu/g.

Example 4

Pyrolysis reaction was carried out in the same manner as in Example 1 except for changing the gas mixture to a gas mixture of 1.5 vol. % of $Fe(CO)_5$ and 0.01 vol. % of n-butyl alcohol and nitrogen as a diluent, with the molar ratio of n-butyl alcohol relative to the iron carbonyl being 0.0067.

Conversion to the iron powder formed was 56% based on the $Fe(CO)_5$ fed.

The product was found by observation with a transmission electron microscope to be an ultrafine powder of the shape of straight chain (length: about 0.2 micron, width: about 0.02 micron). The specific surface area was 29 m$^2$/g. The magnetic coercive force and saturation magnetization were measured using a vibration type magnetometer, and were 1450 oersted and 160 emu/g, respectively.

Example 5

Pyrolysis reaction was carried out in the same manner as in Example 4 except for changing the reaction temperature to 300° C.

The product had a specific surface area of 13 m$^2$/g, a coercive force of 930 oersted and a saturation magnetization of 165 emu/g.

Examples 6–8

Pyrolysis reaction was carried out in the same manner as in Example 4 except for using the compounds shown in Table 1 in place of n-butyl alcohol.

The specific surface area and magnetic characteristics of the products are as shown in Table 1.

TABLE 1

| | | Metal powder | | |
| --- | --- | --- | --- | --- |
| Example | Compound | Specific surface area (m$^2$/g) | Coercive force (Oe) | Saturation magnetization (emu/g) |
| 6 | Trimethyl silanol | 31 | 1580 | 153 |
| 7 | Acetone | 24 | 1310 | 150 |
| 8 | Diethylether | 21 | 1260 | 166 |

Example 9

Pyrolysis reaction was carried out in the same manner as in Example 4 except that hydrogen was used in place of nitrogen, and a mixture of $Co_2(CO)_8/Fe(CO)_5 = 1/20$ (molar ratio) was used in place of $Fe(CO)_5$.

Conversion to Fe-Co ultrafine powder formed was 53%. The specific surface area was 30 m$^2$/g, the coercive force 1800 oersted and the saturation magnetization 145 emu/g.

Comparative Example 4

Pyrolysis reaction was carried out in the same manner as in Example 4 except for changing the concentration of $Fe(CO)_5$ fed into the reaction system to 5 vol. %.

The product had a specific surface area of 12 m$^2$/g, a coercive force of 450 oersted and a saturation magnetization of 155 emu/g.

Comparative Example 5

Pyrolysis reaction was carried out in the same manner as in Example 4 except for changing the intensity of the magnetic field in the reaction system to 40 gauss.

The product had a specific surface area of 19 m$^2$/g, a coercive force of 700 oersted and a saturation magnetization of 150 emu/g.

Example 10

Pyrolysis reaction was carried out in the same manner as in Example 1 except for changing the intensity of the magnetic field applied to 600 gauss, using a gas mixture of 5 vol. % of Fe(CO)$_5$ and 0.005 vol. % of methanethiol and nitrogen as a diluent and changing the reaction temperature to 550° C. The molar ratio of methanethiol added relative to the iron carbonyl was 0.01.

Conversion to the produced ultrafine iron powder was 62% based on the Fe(CO)$_5$ fed.

The product was found by observation with a transmission electron microscope to be an ultrafine powder of the phase of straight chain (length: about 0.15 micron, width: about 0.02 micron). The specific surface area was 31 m$^2$/g. The magnetic coercive force and saturation magnetization were measured using a vibration type magnetometer, and were 1500 oersted and 155 emu/g, respectively.

Example 11

Pyrolysis reaction was carried out in the same manner as in Example 10 except that hyrogen was used in place of nitrogen, and mixture of Co$_2$(CO)$_8$/Fe(CO)$_5$=1/20 (molar ratio) was used in place of Fe(CO)$_5$.

Conversion to Fe-Co ultrafine powder formed was 61%. The specific surface area was 32 m$^2$/g, the coercive force 1800 oersted and the saturation magnetization 140 emu/g.

Comparative Example 6

Pyrolysis reaction was carried out in the same manner as in Example 10 except for changing the concentration of Fe(CO)$_5$ fed into the reaction system to 5 vol. %.

The product had a specific surface area of 12 m$^2$/g, a coercive force of 450 oersted and a saturation magnetization of 155 emu/g.

Comparative Example 7

Pyrolysis reaction was carried out in the same manner as in Example 10 except for changing the intensity of magnetic field in the reaction system to 40 gauss.

The product had a specific surface area of 19 m$^2$/g, a coercive force of 700 oersted and a saturation magnetization of 150 emu/g.

Example 12

Pyrolysis reaction was carried out in the same manner as in Example 10 except for using methylthiomethane in place of methanethiol Conversion to the product was 56%. The specific surface area was 34 m$^2$/g, the coercive force 1430 oersted and the saturation magnetization 145 emu/g.

Application Example 1

100 parts by weight of the metal powder obtained in Example 10, 10 parts by weight of a vinyl chloride-vinyl acetate copolymer, 10 parts by weight of a polyesterpolyurethane copolymer, 5 parts by weight of a dispersing agent and 150 parts by weight of a solvent mixture of methyl ethyl ketone and toluene were mixed in a ball mill and the mixture was dispersed with stirring for 1 hour to prepare a magnetic paint. The magnetic paint obtained was coated on a polyester film so that the thickness of dry paint film will be 3 microns, and then subjected to orientation of metal powder in a magnetic field, followed by drying. Subsequently, the coated film was subjected to calendering treatment and then was cut into a predetermined width.

When the magnetic characteristics of the sheet obtained were measured, the coercive force was found to be 1470 oersted, the residual flux density 3200 gauss and the rectangular ratio (Br/Bm) 0.82.

What is claimed is:

1. In a process for producing an ultrafine powder of a metal by subjecting a transition metal carbonyl compound to gas phase pyrolysis reaction, the improvement which comprises diluting said carbonyl compound with an inert gas or hydrogen to a concentration of 3 vol. % or less with optional addition of an oxygen-containing organic compound and/or a sulfur-containing organic compound in an amount of 0.0001 to 0.1 mol per mol of said carbonyl compound to prepare a gas mixture, and then carrying out gas phase pyrolysis reaction at 300° C. or higher by allowing said gas mixture to reside for 5 seconds or less in a reaction system to which a magnetic field of 100 gauss or higher is being applied, thereby obtaining the ultrafine powder of said metal having a length of 1 micron or less, a coercive force of 800 oersted or higher and a saturation magnetization of 120 emu/g or higher.

2. The process according to claim 1, wherein the transition metal carbonyl compound is Fe(CO)$_5$ or Ni(CO)$_4$.

3. The process according to claim 1, wherein the transition metal carbonyl compound is a mixture of a transition metal carbonyl compound haYing a high boiling point and Fe(CO)$_5$ or Ni(CO)$_4$.

4. The process according to claim 1, wherein the oxygen-containing organic compound is selected from the group consisting of an alcohol, ester, ketone and ether.

5. The process according to claim 4, wherein the oxygen-containing organic compound is an alcohol having 1 to 8 carbon atoms.

6. The process according to claim 5, wherein the alcohol is selected from the group consisting of methyl alcohol, ethyl alcohol, propyl alcohol, butyl alcohol, octyl alcohol, trimethyl silanol and ethylene glycol.

7. The process according to claim 1, wherein the sulfur-containing organic compound is a mercaptan or thioether.

8. The process according to claim 7, wherein the mercaptan is selected from the group consisting of methanethiol, ethanethiol, n-propanethiol, n-butanethiol, n-pentanethiol, and n-hexanethiol.

9. The process according to claim 7, wherein the thioether is selected from the group consisting of methylthiomethane, ethylthiomethane, butylthiomethane, propylthiomethane, ethylthioethane, propylthioethane and butylthioethane.

10. The process according to claim 1, wherein the amount of the oxygen-containing organic compound and/or the sulfur-containing organic compound added is 0.001 to 0.05 mol per mol of said carbonyl compound.

11. The process according to claim 1, wherein the concentration of said carbonyl compound in the inert gas or hydrogen as a diluent is 0.01 to 3 vol. %.

12. The process according to claim 1, wherein the intensity of the magnetic field is in the range of 300 to 1,500 gauss.

13. The process according to claim 1, wherein the pyrolysis reaction is carried out at a temperature of 400° to 700° C.

14. The process according to claim 1, wherein the ultrafine powder obtained has a coercive force of 1300 to 2500 oersted and a saturation magnetization of 120 to 200 emu/g.

15. An ultrafine powder of a metal produced according to the process of claim 1.

* * * * *